(12) United States Patent  
Straub et al.

(10) Patent No.: US 6,461,049 B2  
(45) Date of Patent: Oct. 8, 2002

(54) CAGE FOR A ROLLING BEARING

(75) Inventors: Frank Straub, Hohenroth (DE); Tino Beck, Hochstadt/Aisch (DE)

(73) Assignee: Ina Walzlager Schaeffler oHG (DE)

( * ) Notice: Subject to any disclaimer, the term of this patent is extended or adjusted under 35 U.S.C. 154(b) by 36 days.

(21) Appl. No.: 09/725,736

(22) Filed: Nov. 29, 2000

(65) Prior Publication Data

US 2001/0003548 A1 Jun. 14, 2001

(30) Foreign Application Priority Data

Dec. 10, 1999 (DE) .......................... 199 59 498

(51) Int. Cl.⁷ ............................................... F16L 19/00
(52) U.S. Cl. ........................ 384/470; 384/580; 384/572
(58) Field of Search ................... 384/470, 576, 384/580, 572

(56) References Cited

U.S. PATENT DOCUMENTS

| | | | | |
|---|---|---|---|---|
| 2,219,031 A | * | 10/1940 | Frauenthal et al. | 384/572 |
| 3,597,031 A | * | 8/1971 | Bill | 384/470 |
| 4,133,588 A | | 1/1979 | Earsley | |
| 4,192,560 A | | 3/1980 | Jartnett | |
| 4,472,007 A | * | 9/1984 | De Vito | 384/572 |
| 4,629,339 A | * | 12/1986 | Morinaga | 384/576 |
| 5,328,277 A | * | 7/1994 | Moulton | 384/470 |
| 5,538,348 A | * | 7/1996 | Honda et al. | 384/470 |
| 5,540,506 A | * | 7/1996 | Yokota et al. | 384/580 |
| 5,584,583 A | * | 12/1996 | Hidano | 384/470 |
| 5,630,670 A | | 5/1997 | Griffin et al. | |
| 5,795,080 A | * | 8/1998 | Fujiwara et al. | 384/580 |
| 5,803,620 A | * | 9/1998 | Yokota | 384/580 |
| 5,816,713 A | * | 10/1998 | Prock et al. | 384/470 |
| 6,206,575 B1 | * | 3/2001 | Matsushita et al. | 384/470 |

FOREIGN PATENT DOCUMENTS

| | | | |
|---|---|---|---|
| DE | 3811958 | 10/1989 | |
| DE | 9306319 | 7/1993 | |
| DE | 19738331 | 4/1998 | |
| DE | 29817348 | 4/1999 | |
| JP | 333510 | * 2/1991 | 384/470 |
| JP | 4331820 | * 11/1992 | 384/572 |

OTHER PUBLICATIONS

Neue . . . Lebendsdauer Article (1 pg) Kettennuten–Gleitlager.

Kritische . . . und–nuten fur Gleitlagerungen Article (7 pgs).

Patent Abstracts of Japan No. 11082519A (1 pg) 3/99 Holder for Rolling Bearing.

* cited by examiner

*Primary Examiner*—Douglas C. Butler  
*Assistant Examiner*—Devon C Kramer  
(74) *Attorney, Agent, or Firm*—Bierman, Muserlian and Lucas

(57) ABSTRACT

A rolling bearing cage comprising a first side ring (1) and a second side ring (2) that are connected to each other by crossbars (3) so that pockets (5) for receiving rolling elements (4) are formed, and lubrication grooves (6) extend in axial direction up to said first and second side rings (1, 2) on at least one of peripheral surfaces and bore sections of the crossbars (3) wherein flow channels (7) are arranged in a fractional region of the lubrication grooves (6) and are set back relative to the lubrication grooves (6) in at least one of a radially inward and a radially outward direction. In this way, lubrication of such a bearing is substantially improved.

10 Claims, 7 Drawing Sheets

CAGE FOR A ROLLING BEARING

FIELD OF THE INVENTION

The invention concerns a cage for a rolling bearing, said cage comprising a first side ring and a second side ring that are connected to each other by crossbars so that pockets for receiving rolling elements are formed, and lubrication grooves extend in axial direction up to said first and second side rings on at least one of peripheral surfaces and bore sections of the crossbars.

BACKGROUND OF THE INVENTION

A cage of the pre-cited type is known from the German utility model application G 93 06 319.9. The crossbars connecting the side rings of this cage comprise on their outer and/or inner peripheral surfaces continuous, axially extending lubrication grooves. A drawback of this arrangement is that lubricant flow through a bearing having such a cage is relatively weak due to the small distance between the outer peripheral surface of the cage and the outer raceway. If this lubrication groove were to be deepened in radial direction, the problem would arise during the automatic filling of the cage with rollers that under certain circumstances, the sensor might identify the lubrication groove as a continuous rolling element pocket and an attempt would be made to insert a rolling element into this lubrication groove. It is quite obvious that this can lead to a destruction of the bearing cage.

OBJECTS OF THE INVENTION

It is therefore an object of the invention to provide an improved rolling bearing cage of the pre-cited type which permits a larger flow of lubricant through the bearing.

It is another object of the invention to provide an improved rolling bearing cage of the pre-cited type that causes no problems during the automatic filling of the pockets with rolling elements.

These and other objects and advantages of the invention will become obvious from the following detailed description.

SUMMARY OF THE INVENTION

The invention achieves the above objects by the fact that flow channels are arranged in a fractional region of the lubrication grooves and are set back relative to the lubrication grooves in at least one of a radially inward and a radially outward direction.

By this measure of the invention, additional space is created for the lubricant so that, for example, lubrication of the bearing is possible for its entire life. Besides this, lubricant flow through the bearing is increased so that a better cooling of the bearing by a heightened removal of undesired heat and an improved flushing of dirt particles from the bearing can be realized. In addition, due to the enlarged space for the lubricant, the flow resistance of the bearing as a whole is reduced. A further advantage is that, in spite of the fact that the flow channels deepen the lubrication grooves, these are not identified as pockets during the automatic filling of rolling elements into the cage so that no rolling elements are forced into the lubrication grooves. This is achieved by the fact that the set back flow channels extend only over a part of the extent of the lubrication grooves.

The flow channels of the invention can be configured in many different ways. The decisive feature in each case is that the flow channels should extend only over a fractional region of the lubrication grooves. In one embodiment, the flow channels are configured in the region of the first side ring as two sub channels that are spaced from each other in peripheral direction and merge into each other in a central portion to split up into two sub channels spaced apart in peripheral direction in the region of the second side ring.

In another embodiment, this configuration is reversed i.e., in the region of the first side ring, the flow channels are configured as a single sub channel that splits up in the central portion into two sub channels spaced apart in peripheral direction which, in the region of the second side ring again merge into each other to form a single sub channel.

In still another embodiment, the flow channels are configured in the region of the first side ring as two sub channels that are spaced from each other in peripheral direction, then merge into each other at one point and, continuing from this point, they separate again from each other, so that in the central portion, two peripherally spaced apart sub channels are formed that merge again into each other at a second point and then separate again from each other, so that, in the region of the second ring, two sub channels spaced from each other in peripheral direction are formed.

According to another additional feature of the invention, at least one empty pocket is arranged in the central region of the flow channels. By this measure, the permeability of the cage to lubricant is further enhanced. A further advantage of the invention is obtained by another feature according to which the flow channels comprise, on either side of the central region, a connection to the pockets for receiving the rolling elements.

According to another provision of the invention, the axial dimension of the empty pocket is different from that of the pockets which receive the rolling elements, and the empty pocket may be filled with an additional rolling element.

The invention further provides that the side rings of the cage comprise a bevel. The inclined surface of this bevel facilitates the mounting of the cage, for example, into an associated housing.

Finally, according to a last provision of the invention, a further improvement of lubricant flow through the bearing cage is effected by arranging a further flow channel in the side rings in the region of the rolling elements.

The invention will now be described more closely with reference to the appended drawings.

DETAILED DESCRIPTION OF THE DRAWINGS

Figure 1:
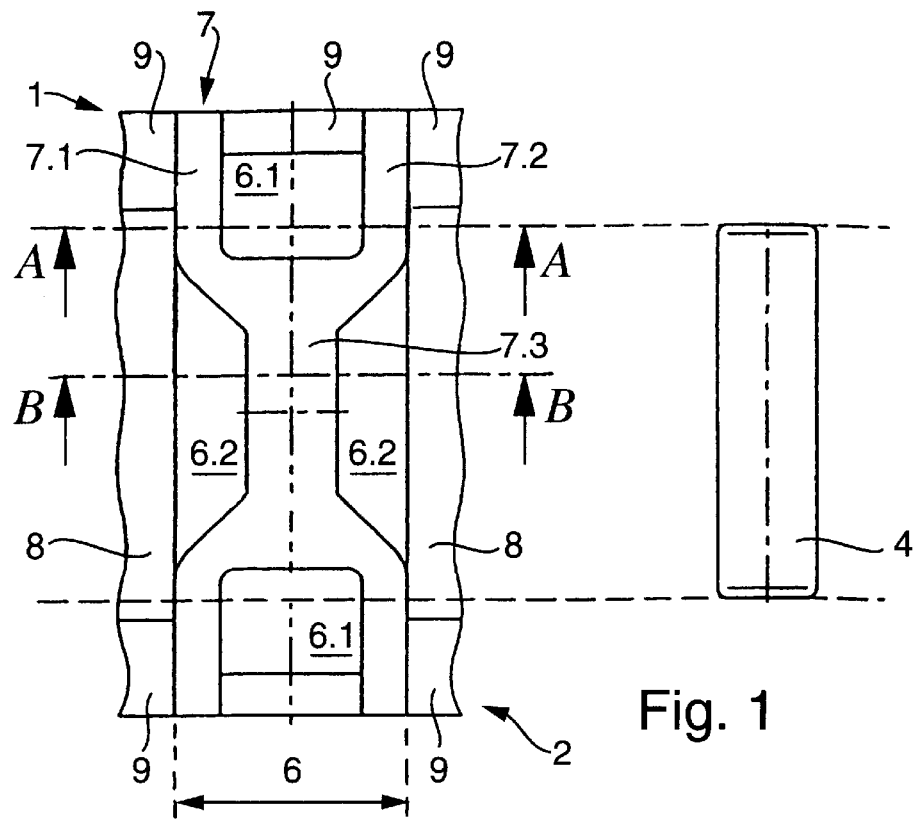
FIG. 1 is a partial top view of a first embodiment of a cage of the invention.

In FIGS. 1 to 19, which show different embodiments of the cage of the invention, similar parts are identified by the same reference numerals. The cages shown in these figures comprise the side rings 1 and 2 that are connected to each other by crossbars 3 to form pockets 5 for receiving rolling elements 4. The crossbars 3 of the individual cages comprise on their outer peripheral surfaces and/or on their inner bore surfaces, lubrication grooves 6 that extend in axial direction from one side ring 1 to the other side ring 2 i. e., they have a continuous configuration. Flow channels 7 are arranged in a fractional region of the lubrication grooves 6 and are made so as to be set back from the lubrication grooves 6 in radially inward or in radially outward direction depending on whether they are positioned on the outer peripheral surface or on the inner bore surface.

Figure 2:
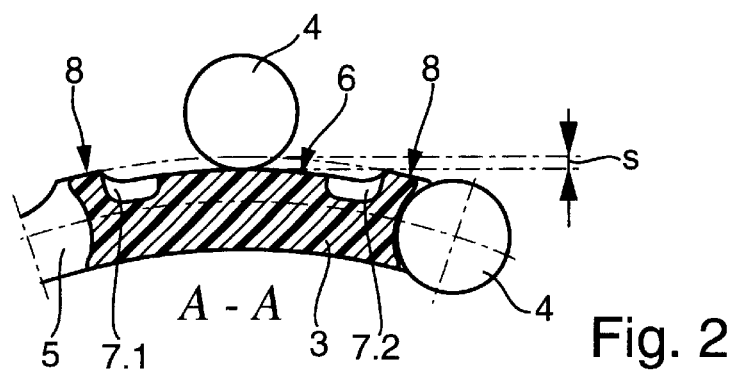
FIG. 2 is a cross-section taken along line A—A of FIG. 1.
Figure 3:
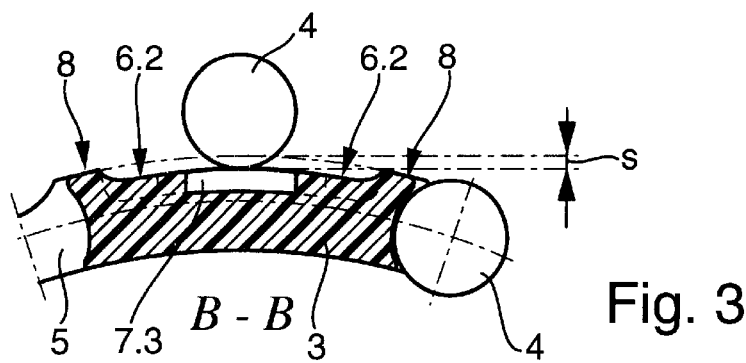
FIG. 3 is a cross-section taken along line B—B of FIG. 1.

As can be seen from FIGS. 1 to 3, in the region of the side ring 1, the flow channel 7 is made up of two parallel sub channels 7.1 and 7.2 that are spaced apart in peripheral direction and then extend at an angle toward each other so as unite and form the sub channel 7.3 in the central region of the crossbar 3. This sub channel 7.3 then splits up scissor-like to again form the sub channels 7.1 and 7.2 that are likewise spaced from each other in peripheral direction in the region of the second side ring 2.

As can be seen further in FIGS. 1 to 3, the above configuration of the channels leads to the formation of two peripherally opposing, radially outer fractional surfaces 8 that define the outer diameter of the cage. These fractional surfaces 8 also define the lubrication grooves 6 in peripheral direction, the groove bottom of these lubrication grooves being set back radially inward from the fractional surfaces 8. This radial dimension difference "s" is designated as a standard lubrication groove depth into which the rolling element 4 cannot sink deeper than one tenth of its diameter. As can be seen in FIGS. 2 and 3, the flow channel 7 with its sub channels 7.1, 7.2 and 7.3 is additionally set back radially to a certain extent from the lubrication groove 6.

The mounting operation is also schematically represented in FIGS. 1 to 3. As shown in FIG. 1, when the cage is turned, the crossbar region 3 comes to face the rolling element 4 to be inserted. When the lubrication groove 6 of the crossbar region 3 reaches the rolling element 4 to be inserted, as shown in FIG. 2, the mounting device recognizes, due to the presence of the standard lubrication groove depth "s", that there is no pocket 5 at this location. Due to the radially inward set back flow channels 7 in the region of the lubrication grooves 6, the clear cross-section of the cage is enlarged so that the supply of lubricant to the bearing is improved without causing any disturbance during the filling of the pockets 5 with rolling elements 4 i.e., the rolling elements 4 are not pushed in in the region of the crossbar 3. To facilitate the insertion of the cage into a housing bore, the side rings 1 and 2 of the cage comprise diameter-reducing bevels 9. The flow channel 7 divides the lubrication groove 6 into two peripherally opposing fractional surfaces 6.2 and two axially opposing fractional surfaces 6.1, all these fractional surfaces being situated at the same radial level.

Figure 4:
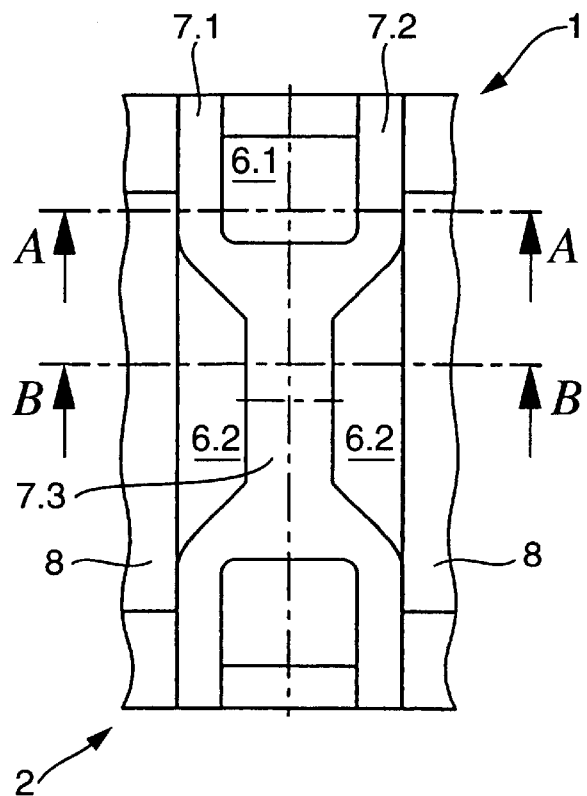
FIG. 4 is a partial top view of a second embodiment of a cage of the invention.
Figure 5:
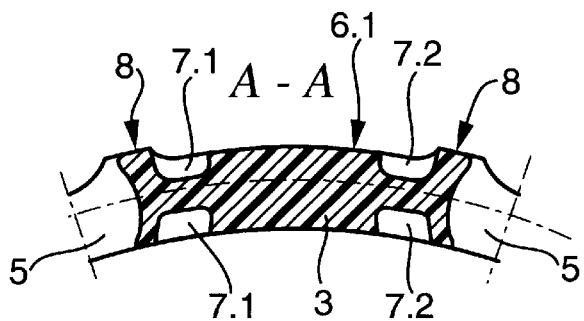
FIG. 5 is a cross-section taken along line A—A of FIG. 4.
Figure 6:
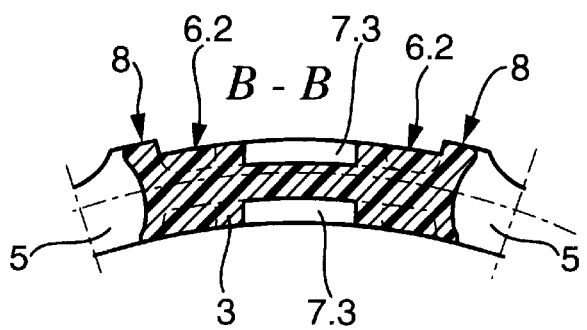
FIG. 6 is a cross-section taken along line B—B of FIG. 4.

The embodiment of the cage shown in FIGS. 4, 5 and 6 differs from the preceding embodiment in that the flow channel 7 composed of the sub channels 7.1, 7.2 and 7.3 is arranged both on the outer peripheral surface and on the bore surface of the cage i.e., on the radially inner and on the radially outer side thereof.

Figure 7:
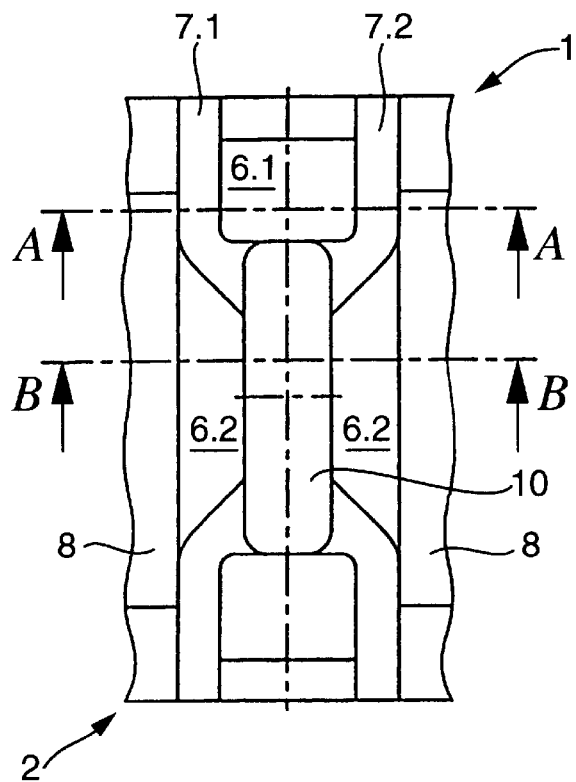
FIG. 7 is a partial top view of a third embodiment of a cage of the invention.
Figure 8:
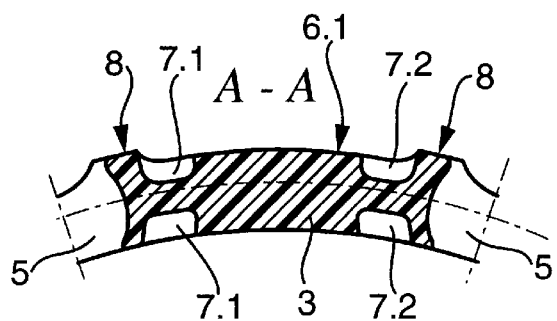
FIG. 8 is a cross-section taken along line A—A of FIG. 7.
Figure 9:
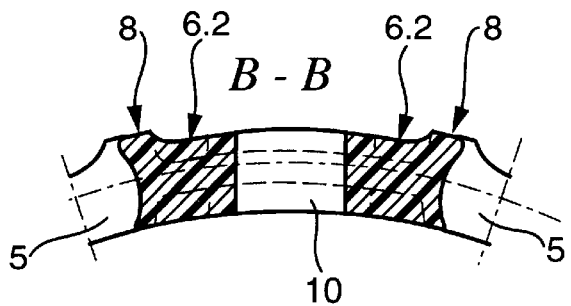
FIG. 9 is a cross-section taken along line B—B of FIG. 7.

FIGS. 7, 8 and 9 show a modification of the cage of FIGS. 4 to 6 comprising, in place of the sub channel 7.3, an empty pocket 10 whose axial extent is smaller than that of the cage pocket 5 and into which, if necessary or desired, an additional rolling element, not shown, may be inserted.

Figure 10:
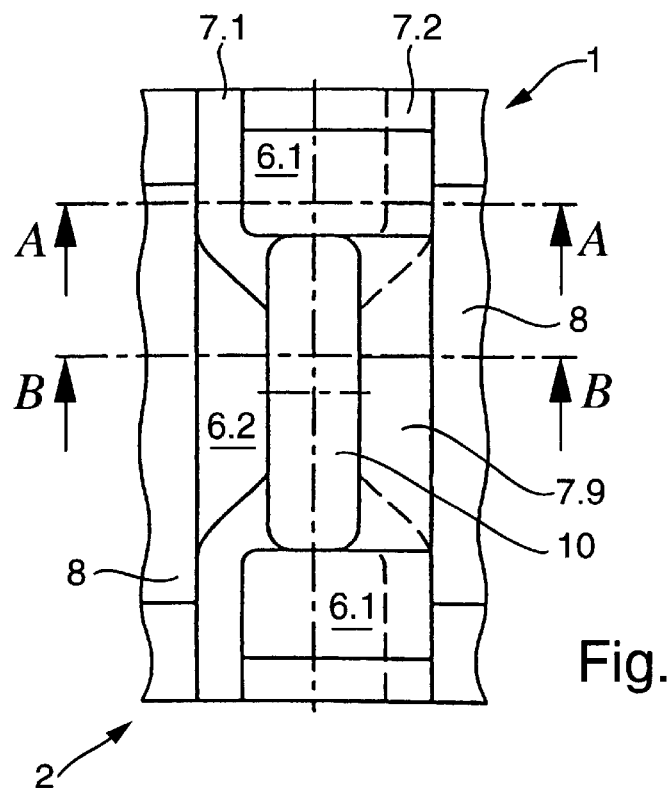
FIG. 10 is a partial top view of a fourth embodiment of a cage of the invention.
Figure 11:
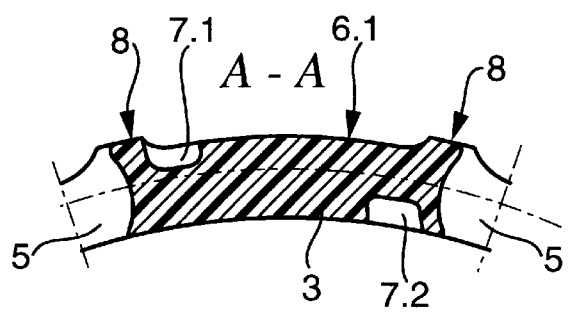
FIG. 11 is a cross-section taken along line A—A of FIG. 10.
Figure 12:
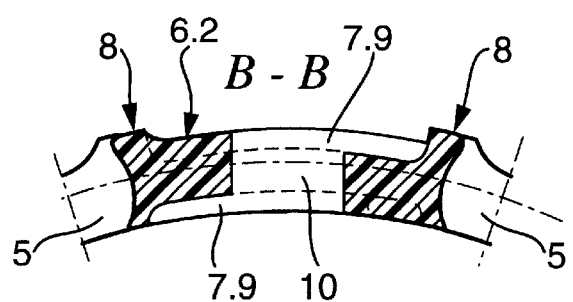
FIG. 12 is a cross-section taken along line B—B of FIG. 10.

The cage illustrated in FIGS. 10, 11 and 12 differs from the cage of FIGS. 7, 8 and 9 in that the sub channel 7.1 is arranged radially on the outside i.e., on the outer peripheral surface and the sub channel 7.2 is arranged radially on the inside i.e., on the bore surface of the cage. The rectangular sub channel 7.9 is defined in peripheral direction by the empty pocket 10 and by the fractional surface 8, and in axial direction, by the fractional surfaces 6.1 and extends both on the outer peripheral surface and on the bore surface of the cage, but, as can be seen in FIG. 12, in an offset arrangement.

Figure 13:
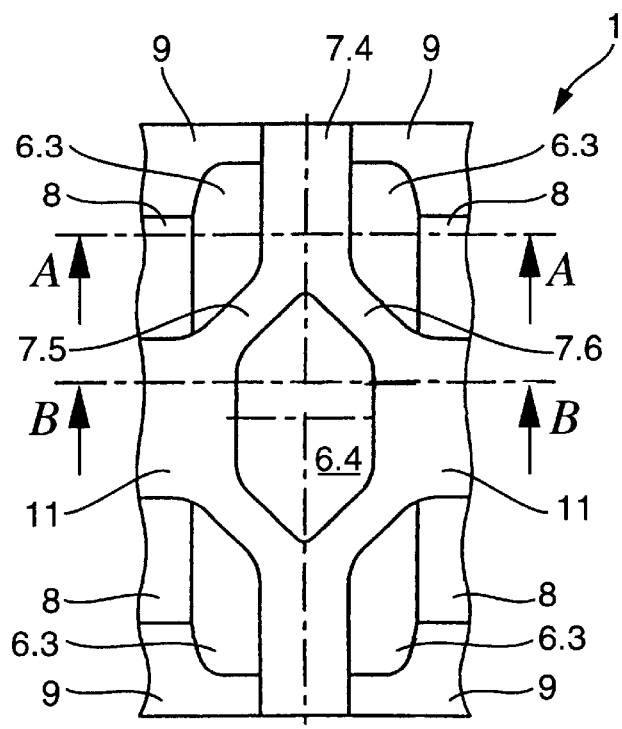
FIG. 13 is a partial top view of a fifth embodiment of a cage of the invention.
Figure 14:
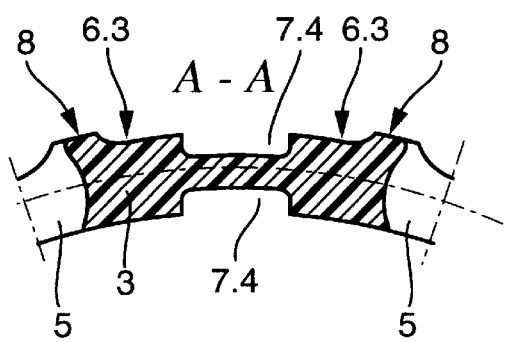
FIG. 14 is a cross-section taken along line A—A of FIG. 13.
Figure 15:
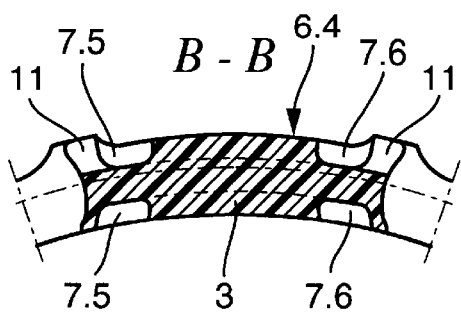
FIG. 15 is a cross-section taken along line B—B of FIG. 13.
Figure 16:
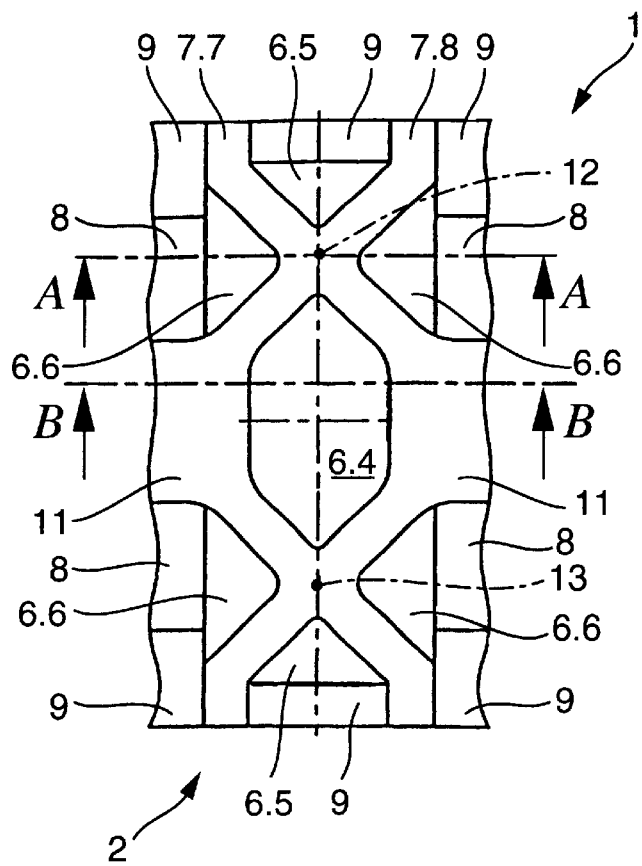
FIG. 16 is a partial top view of a sixth embodiment of a cage of the invention.
Figure 17:
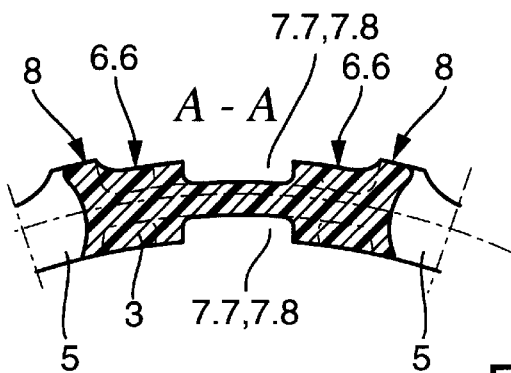
FIG. 17 is a cross-section taken along line A—A of FIG. 16.
Figure 18:
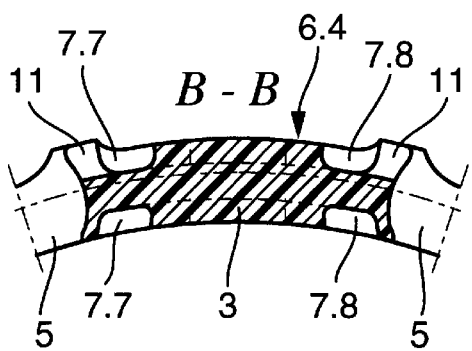
FIG. 18 is a cross-section taken along line B—B of FIG. 16.

A different course of the flow channel 7 extending on both sides i.e., radially on the outside and radially on the inside, can be seen in FIGS. 13, 14 and 15. In this embodiment, the flow channel 7 crosses the cage from one side ring 1 to the other side ring 2 so that, in the region of the side ring 1, the sub channel 7.4 is formed which then splits up scissor-like into the two sub channels 7.5 and 7.6 which, in the central region of the crossbar 3 are parallel to and spaced from each other in peripheral direction and then extend sharply toward each other to again form the sub channel 7.4 in the region of the second side ring 2. The particularity of this cage is that the flow channel 7 comprises, in the central region of the crossbar 3, two connections 11 to the adjoining pockets 5 for the rolling elements 4. Due to the described course of the flow channel 7 made up of the sub channels 7.4, 7.5 and 7.6, the lubrication groove 6 is divided into opposing fractional surfaces 6.3, two each in the peripheral and in the axial direction, and into the central fractional surface 6.4. The outer diameter of the cage is defined by fractional surfaces 8 that are spaced apart, two each in the peripheral and in the axial direction.

The flow channel 7 shown in FIGS. 16, 17 and 18 is again arranged both radially on the outside and radially on the inside and is made up in the region of the side ring 1 of the two parallel sub channels 7.7 and 7.8 that are spaced apart from one another in peripheral direction. These two sub channels then extend at an angle toward each other and unite at the point 12 to continue from there separately so that, in the central region, they extend at a distance from each other and then, from there, again toward each other to meet at the point 13. From this point on, they again split up scissor-like so that in the region of the second side ring 2, they are likewise spaced apart from each other in the peripheral direction. Due to this course of the flow channel 7, the lubrication groove 6 is divided into the central fractional surface 6.4, the two axially opposing fractional surfaces 6.5 and into opposing fractional surfaces 6.6, two each in the peripheral and in the axial direction. The outer diameter of the cage is defined by fractional surfaces 8 that are spaced apart, two each in the peripheral and in the axial direction.

Figure 19:
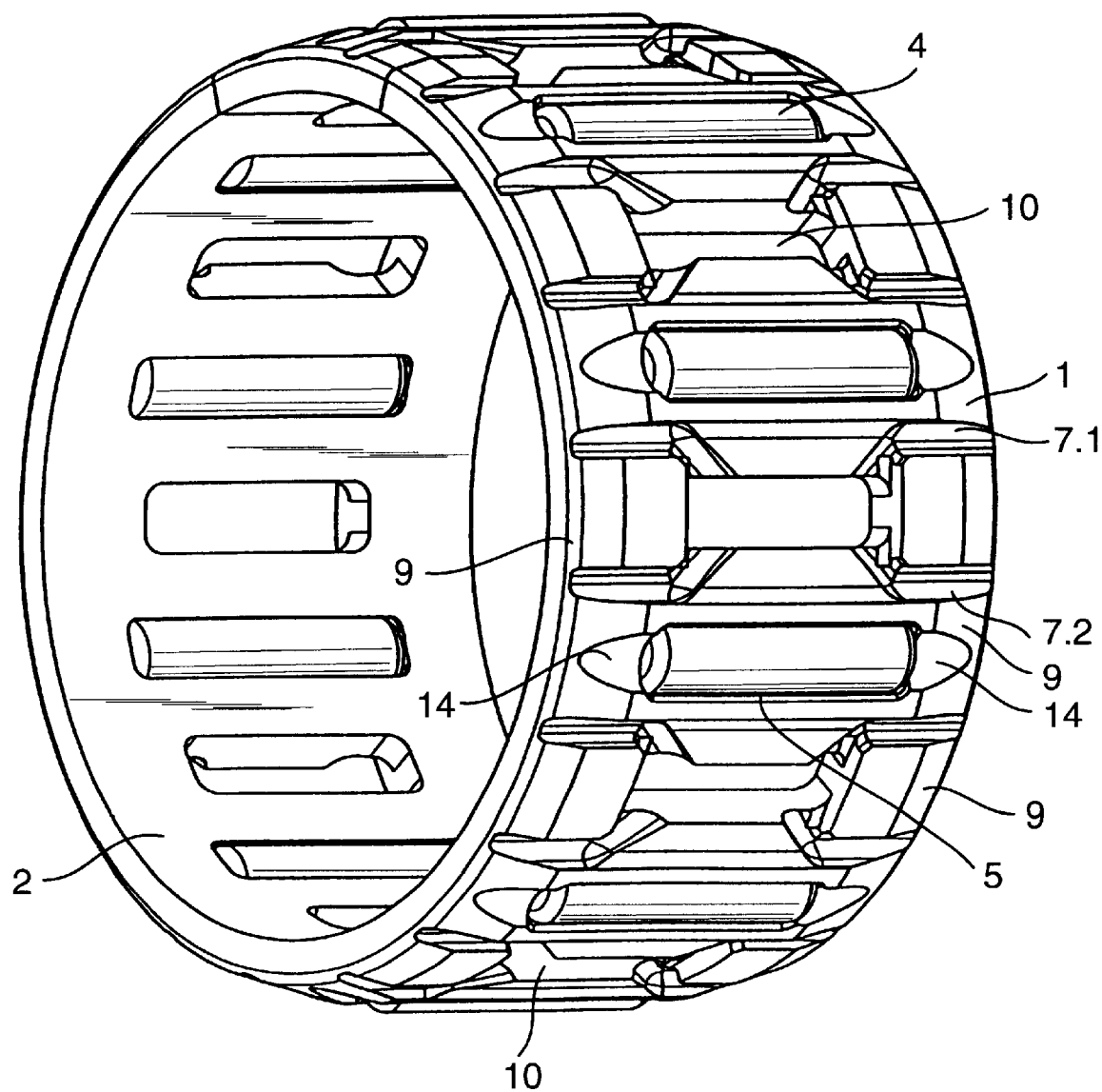
FIG. 19 is a perspective overall view of a cage of the invention.

For the sake of more clearness, FIG. 19 finally shows a perspective view of a cage of the invention in which the flow channel 7 with its sub channels 7.1, 7.2 is arranged only radially on the outside i.e., on the outer peripheral surface of the cage. This cage also comprises an empty pocket 10, and the cage pockets 5 comprise two additional flow channels 14 in the region of the side rings 1 and 2.

The invention is not limited to the single-row cages described in the different embodiments of the invention but can be used with multi-row cages as well.

What is claimed is:

1. A rolling bearing cage comprising a first side ring and a second side ring that are connected to each other by crossbars so that the pockets for receiving rolling elements are formed, and lubrication grooves extend in an axial direction up to said first and second side rings on at least one of peripheral surfaces and bore sections of the lubrication grooves and are set back relative to the lubrication grooves in at least one of a radially inward and a radially outward direction.

2. A cage of claim 1 wherein the flow channels are configured in a region of the first side ring as two sub channels that are spaced from each other in peripheral direction and merge into each other in a central portion to split up again into two sub channels that are spaced apart in peripheral direction in a region of the second side ring.

3. A cage of claim 1 wherein the flow channels are configured in a region of the first side ring as a single sub channel that splits up in a central portion into two sub channels that are spaced apart in peripheral direction and which, in a region of the second side ring, again merge into each other to form a single sub channel.

4. A cage of claim 1 wherein the flow channels are configured in a region of the first side ring as two sub channels that are spaced from each other in peripheral direction, then merge into each other at one point and, continuing from said one point, separate again from each other, so that two peripherally spaced apart sub channels are formed in a central portion that merge again into each other at a second point and then separate again from each other, so that, in a region of the second ring, two sub channels spaced from each other in peripheral direction are formed.

5. A cage of claim 1 wherein at least one empty pocket is arranged in a central region of the flow channels.

6. A cage of claim 1 wherein the flow channels comprise, on either side of a central region, a connection to the pockets for receiving the rolling elements.

7. A cage of claim 5 wherein an axial dimension of the empty pocket is different from that of the pockets for receiving the rolling elements.

8. A cage of claim 5 wherein the empty pocket comprises an additional rolling element.

9. A cage of claim 1 wherein the first and second side rings comprise a bevel.

10. A cage of claim 1 wherein a further flow channel is arranged in a region of the rolling elements in the first and second side rings.

\* \* \* \* \*